United States Patent Office 2,894,205
Patented July 7, 1959

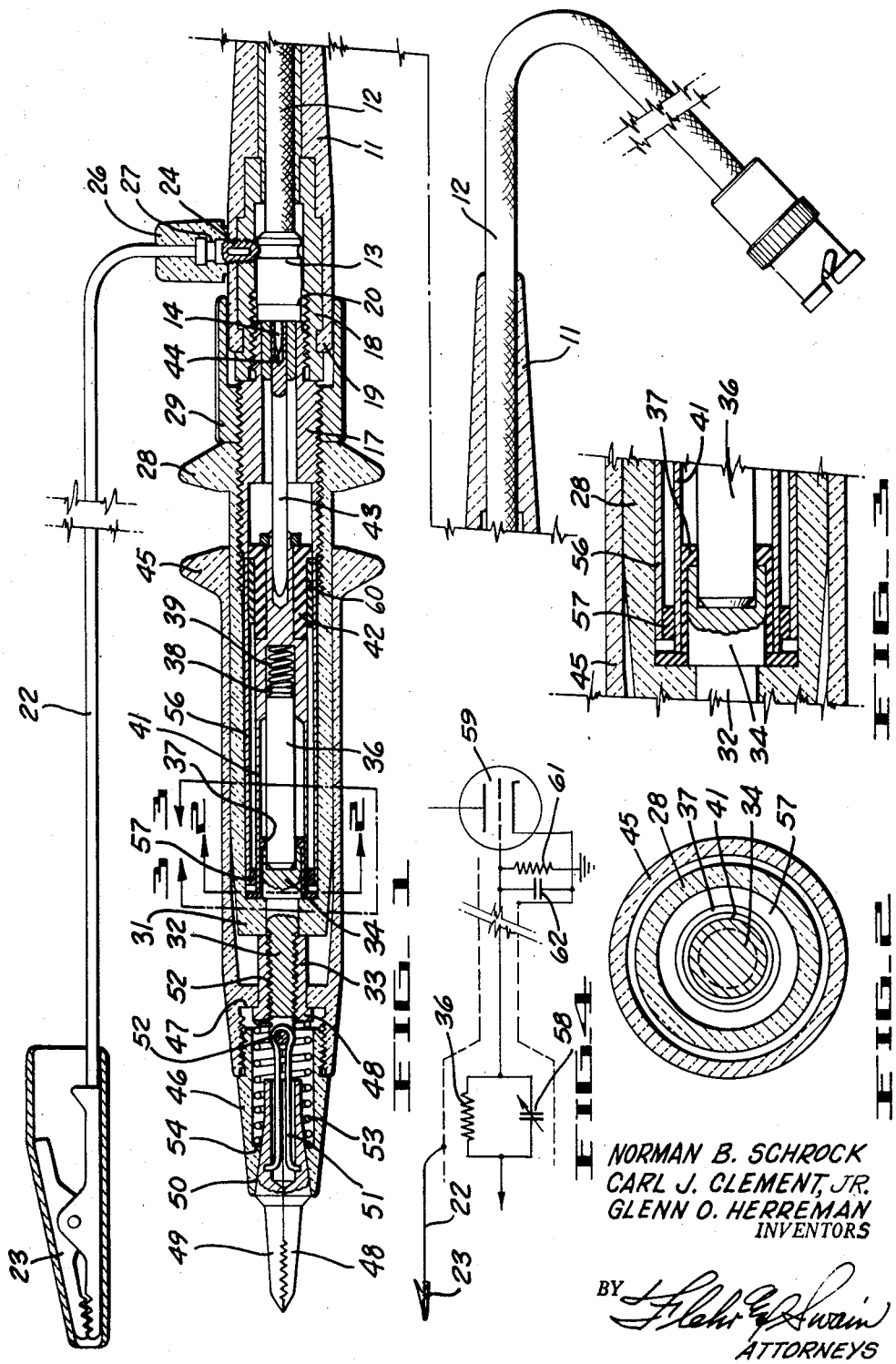

2,894,205

PROBE ASSEMBLY

Norman B. Schrock, Los Altos, and Carl J. Clement, Jr., and Glenn O. Herreman, Palo Alto, Calif., assignors to Hewlett-Packard Company, Palo Alto, Calif., a corporation of California Application January 8, 1957, Serial No. 632,992

8 Claims. (Cl. 324—72.5)

This invention relates generally to a probe assembly and more particularly to a probe assembly of the voltage divider type.

As is well known, probes are employed at the end of connecting cables for obtaining test signals from electrical apparatus. It is desirable to have a probe which has a high input impedance whereby loading of the apparatus under test is minimized. In general, this may be accomplished by reducing the capacity presented by the probe. The design of prior art probes is such that the capacity presented in even the best probes is appreciable.

It is a general object of the present invention to provide an improved probe assembly.

It is a further object of the present invention to provide a probe assembly in which the capacity presented by the probe is relatively low.

It is a further object of the present invention to provide a probe assembly which is easily operated.

It is a further object of the present invention to provide a probe assembly in which the probe capacity may be easily adjusted to present the desired impedance to the test equipment associated therewith.

It is a further object of the present invention to provide a probe assembly which includes a pair of jaws which are operated from the rear of the probe assembly whereby connection to a wire or lead is rapidly, safely and easily effected.

These and other objects of the invention will appear more clearly from the following description and the accompanying drawing.

Referring to the drawing:

Figure 1 is a sectional elevational view of the probe assembly;

Figure 2 is a sectional view taken along the line 2—2 of Figure 1;

Figure 3 is an enlarged view of the portion 3—3 of the probe; and

Figure 4 is an equivalent circuit diagram for the probe and associated test equipment.

Referring to Figure 1, the handle 11 which may be made of rubber, neoprene or other suitable insulating material accommodates the shielded cable 12. The shield is suitably secured to the collar 13. The inner conductor is suitably secured to a pin 14 which is held coaxial with the shield and insulated therefrom.

The metallic body 17 is threaded to receive the sleeve 18. The handle 11 fits over the sleeve and has its end portion 19 accommodated in a circumferential slot formed near the end of the sleeve. The collar 13 is adapted to fit into the sleeve 18 with the shoulder 20 preventing axial movement of the collar as it is engaged. A ground cable 22 having a suitable clamp 23 at one end has its other end in electrical contact with the cable shield. Thus, the sleeve 18 receives the member 24. The grounding cable 22 is suitably attached to the member 24 and held by the sleeve 18. A cap or cover 26 which is made of rubber or other suitable material is molded over the member 24 and is held in the groove 27.

The main portion of the body 17 is threaded to receive a capacitor adjusting sleeve 28 which is made of suitable insulating material, such as plastic, and the lock nut 29. The forward end 31 of the capacitor adjusting sleeve holds the member 32. The member 32 is threaded to receive the adaptor nut 33. The rear end 34 of member 32 is bored to receive and make electrical contact with the forward end of the resistor 36. A dielectric sleeve 37 is carried by the portion 34 of member 32. The other end of the resistor 36 is in electrical contact with the spring tip 38 which is accommodated within the coiled spring 39. The other end of the spring 39 is electrically connected to the inner conductor of the shielded cable 12. The spring 39 is accommodated within the rear portion of the shield 41. A spacer 42 surrounds the rear portion of the shield and is accommodated in the body 17. The spacer 42 serves to hold the shield coaxial. As illustrated, the shield carries a rod 43 which extends to the rear and which is provided with a recess 44 which receives the pin 14.

The forward portion of the shield 41 is spaced from the resistor body to form an annular gap. The portion 34 of the member 32 carries a dieelectric member 37 and the combination is adapted to fit within the annular gap. The portion 34 of member 32 forms the inner plate of a capacitor while the end of the shield 41 forms the outer plate. The dielectric member 37 serves as the dielectric for the capacitor. Movement of the member 32 moves the inner plate and changes the area of plates disposed opposite one another to control the capacitance. Since the other end of the shield 41 is connected to the resistor, the capacitance is in shunt with the resistor. The position of member 32 is controlled by loosening the lock nut 29 and rotating the adjusting sleeve 28. Thus, the probe can be easily tuned. Another advantage of the use of this type capacitor is that the capacitance to ground at the probe is considerably reduced, as will be presently described.

The collet sleeve 45 is slidably carried by the capacitor adjusting sleeve. The forward portion of the sleeve 45 is threaded to engage the collet 46. The shoulder 47 is adapted to engage the shoulder 48 formed on the adaptor nut 33. A pair of jaws 48 and 49 fit within the tapered opening 50 of the collet 46. The hairpin spring 51 serves to urge the jaws apart when the collet is retracted. The hairpin spring 51 has its rear portion engaged by the pin 52 which is carried by the adaptor nut 33.

The spring 53 is compressed between the shoulder 54 formed in the collet 46 and the forward portion of the adaptor nut 33 and serves to urge the collet 46 and sleeve 45 forward to bring the shoulder 47 into abutment with the opposing shoulder 48.

To open the jaws, the flange formed on the rear portion of the sleeve 45 is engaged with the fingers and the collet 46 and sleeve 45 are drawn to the rear. This compresses the spring 53 and moves the collet back along the jaws whereby the jaws may expand under the urging of the spring 51.

A ground shield 56 is electrically connected to the body 17 and extends forward concentric with and surrounding the inner shield 41. A spacer 57 serves to hold the forward end of the ground shield coaxial with the inner shield. The other end is held coaxial by sleeve 60. The probe is shielded to the end adjacent the jaws whereby stray signal and noise pickup is considerably reduced.

The capacitor formed by member 32, shield 41 and dielectric sleeve 37 is shielded from the ground shield 56 by the inner shield 41. As a result, the shunt capacity to ground of the probe is considerably reduced as compared to probes which employ a lumped capacitor in shunt with the resistor.

Referring particularly to Figure 4, the resistor 36 corresponds to the resistor 36 in the probe. The variable capacitor 58 corresponds to the capacity formed between the outer plate, shield 41, and the inner plate, portion 34 of member 32. The capacity is controlled by movement of the member 32. The tube 59 represents the amplifier tube of the test equipment. The resistor 61 represents resistance, and the capacitor 62 the capacitance presented to the probe.

Thus it is seen that there is provided a probe which is easily operated. The shunt capacity of the probe is adjustable whereby the probe may be tuned to a particular piece of test equipment, and the input capacity of the probe is very small.

We claim:

1. A probe for obtaining a signal from apparatus under test including a connecting cable, resistance means including a resistor having one end electrically connected to said cable, means for electrically connecting the probe to a signal source, a cylindrical shield surrounding said resistor having one end electrically connected to one end of the resistor, a member adapted to receive the other end of said resistor electrically connected to said connecting means, a dielectric sleeve mounted on said member, means to slide said member and sleeve within the other end of said shield, said shield and member forming the plates of a capacitor whereby one plate is connected to one end of the resistor and the other plate is connected to the other end of the resistor.

2. A probe assembly for obtaining a signal from apparatus under test including a connecting cable having a center conductor and shield, resistance means including a resistor having one end electrically connected to the center conductor, means for electrically connecting the probe to a signal source, a shield surrounding said resistor having one end electrically connected to one end of the resistor, a member adapted to receive the other end of said resistor electrically connected to said connecting means, a dielectric sleeve mounted on said member, means to slide said member and sleeve within the other end of said shield, said shield and member forming the plates of a capacitor whereby one plate is connected to one end of the resistor and the other plate is connected to the other end of the resistor, and an outer shield concentric with the inner shield and connected to the cable shield.

3. A probe assembly as in claim 2 wherein said member and dielectric sleeve are adapted to move together axially within the shield to thereby control the capacitance between said shield and member.

4. A probe comprising a body, a shielded electrical cable having a center conductor and a shield, said body adapted to receive said cable with the shield in electrical contact with said body and the center conductor extending concentric therewith and insulated therefrom, a resistor having one end electrically connected to said inner conductor, a shield surrounding said resistor and electrically connected to said one end of the resistor, a member adapted to receive the other end of said resistor, a dielectric sleeve carried by said member, means to slide said member and sleeve within said shield, said shield and member forming the plates of a capacitor with one plate connected to one end of the resistor and the other plate connected to the other end thereof, and means threadably carried by said body for adjusting the penetration of said member into said shield to thereby control the capacity between the member and shield.

5. A probe comprising a body, a shielded electrical cable having a center conductor and shield, said body adapted to receive said cable with the shield in electrical contact with said body and the center conductor extending concentric therewith and insulated therefrom, a resistor having one end electrically connected to said inner conductor, a cylindrical shield surrounding said resistor and electrically connected to the conductor end thereof, a member adapted to receive the other end of said resistor, a dielectric sleeve carried by said member, means to slide said member and sleeve within the shield, said member and shield forming the plates of a capacitor, a first sleeve having one end in engagement with said member and having its other end threaded to said body, whereby movement of said sleeve axially of the body serves to control the penetration of the member and dielectric sleeve to control the capacity, means for releasably connecting said member to associated electrical apparatus connected to said member, and a second sleeve serving to engage and control said connecting means, said sleeve being concentric with and slidably carried by the first sleeve.

6. A probe assembly as in claim 5 wherein said means for releasably connecting said member to associated equipment comprises a pair of spring loaded jaws and a collet surrounding said jaws and controlling the opening and closing of the same; and wherein said second sleeve engages the collet and provides means for moving the same to thereby control the opening and closing of the jaws.

7. A probe assembly comprising a conductive body, a shielded electrical cable having a center conductor and a shield, said body being adapted to receive said cable with the shield in electrical contact therewith and the central conductor extending through and insulated therefrom, a resistor having one end electrically connected to said central conductor, an inner shield concentric with said resistor and electrically connected to the conductor end thereof, an outer shield spaced from and surrounding said inner shield, said outer shield being electrically connected to said body, a member adapted to receive the other end of said resistor, a dielectric sleeve carried by said member, means to slide said member and said dielectric sleeve within the inner shield, said member forming one plate of a capacitor, the adjacent end of the shield forming the other plate and said dielectric means serving to capacitively couple the two plates, a first sleeve engaging said member and having its other end threaded to said body to move the member to control the capacitance, means for releasably connecting said member to associated electrical apparatus, and a second sleeve serving to engage and control said connecting means, said sleeve concentric with and slidably carried by the first sleeve.

8. A probe assembly as in claim 7 wherein said means for releasably connecting said member to associated equipment comprises a pair of spring loaded jaws pivotally carried by said member, and a collet surrounding said jaws and controlling the opening and closing of the same, said second sleeve being adapted to engage said collet and provide means for moving the same to thereby control the opening and closing of the jaws.

References Cited in the file of this patent

UNITED STATES PATENTS

| 1,578,977 | Frasse | Mar. 30, 1926 |
| 2,685,673 | Avins | Aug. 3, 1954 |
| 2,849,681 | Belart | Aug. 26, 1958 |

FOREIGN PATENTS

| 592,501 | Great Britain | Sept. 19, 1947 |
| 748,811 | Great Britain | May 9, 1956 |

OTHER REFERENCES

Radio News, May 1948, page 55.
Radio Electronics, March 1955, pp. 96–97.